US009938973B2

(12) United States Patent
Kito et al.

(10) Patent No.: US 9,938,973 B2
(45) Date of Patent: Apr. 10, 2018

(54) VEHICLE HYDRAULIC SUPPLY APPARATUS

(71) Applicant: AISIN AW CO., LTD., Anjo-shi, Aichi-ken (JP)

(72) Inventors: Masashi Kito, Anjo (JP); Taisuke Fukui, Gamagori (JP); Osamu Murai, Toyota (JP)

(73) Assignee: AISIN AW CO., LTD., Anjo (JP)

( * ) Notice: Subject to any disclaimer, the term of this patent is extended or adjusted under 35 U.S.C. 154(b) by 129 days.

(21) Appl. No.: 14/916,042

(22) PCT Filed: Sep. 30, 2014

(86) PCT No.: PCT/JP2014/076033
§ 371 (c)(1),
(2) Date: Mar. 2, 2016

(87) PCT Pub. No.: WO2015/046560
PCT Pub. Date: Apr. 2, 2015

(65) Prior Publication Data
US 2016/0230756 A1    Aug. 11, 2016

(30) Foreign Application Priority Data

Sep. 30, 2013  (JP) ................................. 2013-204931
Nov. 1, 2013   (JP) ................................. 2013-228383

(51) Int. Cl.
*E03B 5/00*      (2006.01)
*F04C 11/00*     (2006.01)
(Continued)

(52) U.S. Cl.
CPC ............ *F04C 11/003* (2013.01); *B60R 17/02* (2013.01); *F01C 21/108* (2013.01); *F04C 2/102* (2013.01);
(Continued)

(58) Field of Classification Search
CPC .. F04C 11/001; F04C 11/003; F16H 57/0439; B60R 17/02
(Continued)

(56) References Cited

U.S. PATENT DOCUMENTS 3,299,816 A * 1/1967 Momchilovich ..... F04C 11/001
                                                    418/130
5,842,837 A * 12/1998 Nakayoshi ............ F04C 11/001
                                                    417/286
(Continued)

FOREIGN PATENT DOCUMENTS

JP    H05-24981 U    4/1993
JP    H09-126157 A   5/1997
(Continued)

OTHER PUBLICATIONS

Dec. 22, 2014 International Search Report issued in International Patent Application No. PCT/JP2014/076033.

*Primary Examiner* — Craig Schneider
*Assistant Examiner* — Angelisa L Hicks
(74) *Attorney, Agent, or Firm* — Oliff PLC

(57) ABSTRACT

A vehicle hydraulic supply apparatus with an oil passage component member that includes a first surface being in contact with a first rotor that is a pump rotor of the mechanical oil pump, a second surface facing in a direction opposite to a direction in which the first surface faces and being in contact with a second rotor that is a pump rotor of the electric oil pump, and a suction oil passage and a discharge oil passage of the mechanical oil pump which are located between the first surface and the second surface, and a suction oil passage and a discharge oil passage of the electric oil pump which are located between the first surface and the second surface.

14 Claims, 9 Drawing Sheets

(51) Int. Cl.

| | |
|---|---|
| *F01C 21/10* | (2006.01) |
| *F04C 2/10* | (2006.01) |
| *F04C 2/344* | (2006.01) |
| *F04C 15/06* | (2006.01) |
| *F16H 61/00* | (2006.01) |
| *B60R 17/02* | (2006.01) |
| *F04C 2/18* | (2006.01) |
| *F04C 15/00* | (2006.01) |

(52) U.S. Cl.
CPC .............. *F04C 2/18* (2013.01); *F04C 2/3441* (2013.01); *F04C 2/3442* (2013.01); *F04C 11/005* (2013.01); *F04C 15/008* (2013.01); *F04C 15/06* (2013.01); *F16H 61/0031* (2013.01)

(58) Field of Classification Search
USPC ...................................... 137/565.29; 417/286
See application file for complete search history.

(56) References Cited

U.S. PATENT DOCUMENTS

2007/0151546 A1* 7/2007 Omote .................. B60K 6/387
  123/458
2010/0242699 A1   9/2010 Sasaki et al.

FOREIGN PATENT DOCUMENTS

| JP | 2010-158975 A | 7/2010 |
| JP | 2010-236581 A | 10/2010 |
| JP | 2012-057675 A | 3/2012 |

* cited by examiner

VEHICLE HYDRAULIC SUPPLY APPARATUS

BACKGROUND

The present disclosure relates to a vehicle hydraulic supply apparatus including a mechanical oil pump configured to be driven by a driving source of wheels, an electric oil pump configured to be driven by an electric motor, and an oil passage component member for the mechanical oil pump and the electric oil pump.

As a vehicle hydraulic supply apparatus described above, an apparatus described in Japanese Patent Application Publication No. 2010-158975 is known, for example. In the technique of Japanese Patent Application Publication No. 2010-158975, a mechanical oil pump and an electric oil pump are respectively fixed to attachment surfaces formed on both sides of an oil passage component member. The attachment surface to which the mechanical oil pump is fixed has an oil suction port and an oil discharge port for the mechanical oil pump, whereas the attachment surface to which the electric oil pump is fixed has an oil suction port and an oil discharge port for the electric oil pump.

SUMMARY

It is desired to reduce the size of an entire apparatus by sharing oil passage component members between a mechanical oil pump and an electric oil pump to form a compact oil passage.

However, Japanese Patent Application Publication No. 2010-158975 only shows a schematic configuration, and a specific configuration is not described.

Under these circumstances, it has been desired to provide a vehicle hydraulic supply apparatus in which the size of the entire apparatus is reduced by sharing oil passage component members between a mechanical oil pump and an electric oil pump to form a compact oil passage.

As a characteristic configuration of a vehicle hydraulic supply apparatus according to an exemplary aspect of the present disclosure including a mechanical oil pump configured to be driven by a driving source of a wheel, an electric oil pump configured to be driven by an electric motor, and an oil passage component member for the mechanical oil pump and the electric oil pump, the oil passage component member includes a first surface being in contact with a first rotor that is a pump rotor of the mechanical oil pump, a second surface facing in a direction opposite to a direction in which the first surface faces and being in contact with a second rotor that is a pump rotor of the electric oil pump, and a suction oil passage and a discharge oil passage of the mechanical oil pump which are located between the first surface and the second surface, and a suction oil passage and a discharge oil passage of the electric oil pump which are located between the first surface and the second surface, a rotation shaft center of the first rotor is disposed parallel to a rotation shaft center of the second rotor, and a rotation direction of the first rotor is opposite to a rotation direction of the second rotor.

With this characteristic configuration, in the oil passage component member, the suction oil passage and the discharge oil passage of the mechanical oil pump and the suction oil passage and the discharge oil passage of the electric oil pump are collectively disposed between the first surface in contact with the first rotor of the mechanical oil pump and the second surface in contact with the second rotor of the electric oil pump.

In general, a circumferential location at which a suction oil passage is connected to a suction port and a circumferential location at which a discharge oil passage is connected to a discharge port vary depending on the rotation direction of an oil pump. In the characteristic configuration described above, since the rotation direction of the mechanical oil pump is opposite to the rotation direction of the electric oil pump, the circumferential location of the discharge oil passage of the mechanical oil pump can be easily changed from the circumferential location of the discharge oil passage of the electric oil pump. Thus, for example, it is easier to prevent overlapping between a first discharge oil passage and a second discharge oil passage as viewed from the axial direction. In this manner, the width (the axial length) of the oil passage component member between the first surface and the second surface at opposite ends thereof can be easily reduced, so that the size of the apparatus can be reduced.

Preferably, the oil passage component member includes, in an outer peripheral surface of the oil passage component member, a first discharge end opening that is an end opening of the discharge oil passage of the mechanical oil pump and a second discharge end opening that is an end opening of the discharge oil passage of the electric oil pump, and the first discharge end opening and the second discharge end opening are disposed at different locations as viewed from an axial direction of a rotation shaft center of the first rotor or the second rotor, and overlap each other as viewed from a circumferential direction of the rotation shaft center.

With this configuration, the first discharge end opening and the second discharge end opening are disposed at different locations as viewed from the axial direction of the rotation shaft center so as to overlap each other as viewed from the circumferential direction of the rotation shaft center. Thus, as compared to a case where these openings overlap each other as viewed from the axial direction, an increase in the width (the axial length) of the oil passage component member can be suppressed, so that the axial length of the entire apparatus can be reduced.

Preferably, an upstream end portion of the suction oil passage of the mechanical oil pump and an upstream end portion of the suction oil passage of the electric oil pump serve as a common oil passage.

With this configuration, the suction oil passage is shared as the common oil passage by the mechanical oil pump and the electric oil pump in the upstream end portions. Thus, the size of the suction oil passage can be reduced as a whole. In addition, since an oil suction part such as a strainer can be shared, so that the number of components and the size of the apparatus can be reduced.

Preferably, the oil passage component member includes, in an outer peripheral surface of the oil passage component member, a suction end opening shared by the suction oil passage of the mechanical oil pump and the suction oil passage of the electric oil pump, a first discharge end opening that is an end opening of the discharge oil passage of the mechanical oil pump, and a second discharge end opening that is an end opening of the discharge oil passage of the electric oil pump, and the first discharge end opening and the second discharge end opening are open in a direction opposite to a direction in which the suction end opening is open.

With this configuration, oil sucked from the suction end opening is transferred radially inward through the suction oil passage, sucked from the pump rotor, and discharged to the side opposite to the suction oil passage with respect to the rotation shaft center. Then, the oil is transferred radially outward through the first discharge oil passage and the second discharge oil passage, and discharged from the first discharge end opening and the second discharge end opening. That is, oil sucked from the suction end opening is transferred toward the opposite side with the rotation shaft center of the pump rotor therebetween in the radial direction, and is transferred to the first discharge end opening and the second discharge end opening. In this manner, bending of the oil passages can be reduced and the oil passages can be shortened, leading to a reduction of a pressure loss. As a result, a drive load of each oil pump can be reduced, thereby enhancing the fuel efficiency of a vehicle.

Preferably, an angular range including a suction port of the mechanical oil pump with respect to a rotation shaft center of the first rotor and an angular range including a suction port of the electric oil pump with respect to a rotation shaft center of the second rotor overlap each other.

With this configuration, the mechanical oil pump and the electric oil pump can be easily partially shared.

Preferably, the discharge oil passage of the mechanical oil pump and the discharge oil passage of the electric oil pump do not overlap each other as viewed from an axial direction of the rotation shaft centers of the first rotor and the second rotor, and overlap each other as viewed from a circumferential direction of the rotation shaft centers, in a region radially outward of the first rotor and the second rotor.

With this configuration, even in a case where the first discharge oil passage and the second discharge oil passage are independent of each other, an increase in the width (the axial length) of the oil passage component member can be suppressed, so that the axial length of the entire apparatus can be reduced.

DETAILED DESCRIPTION OF EMBODIMENTS

A vehicle hydraulic supply apparatus 2 according to the present disclosure will be described with reference to the drawings.

Figure 1:
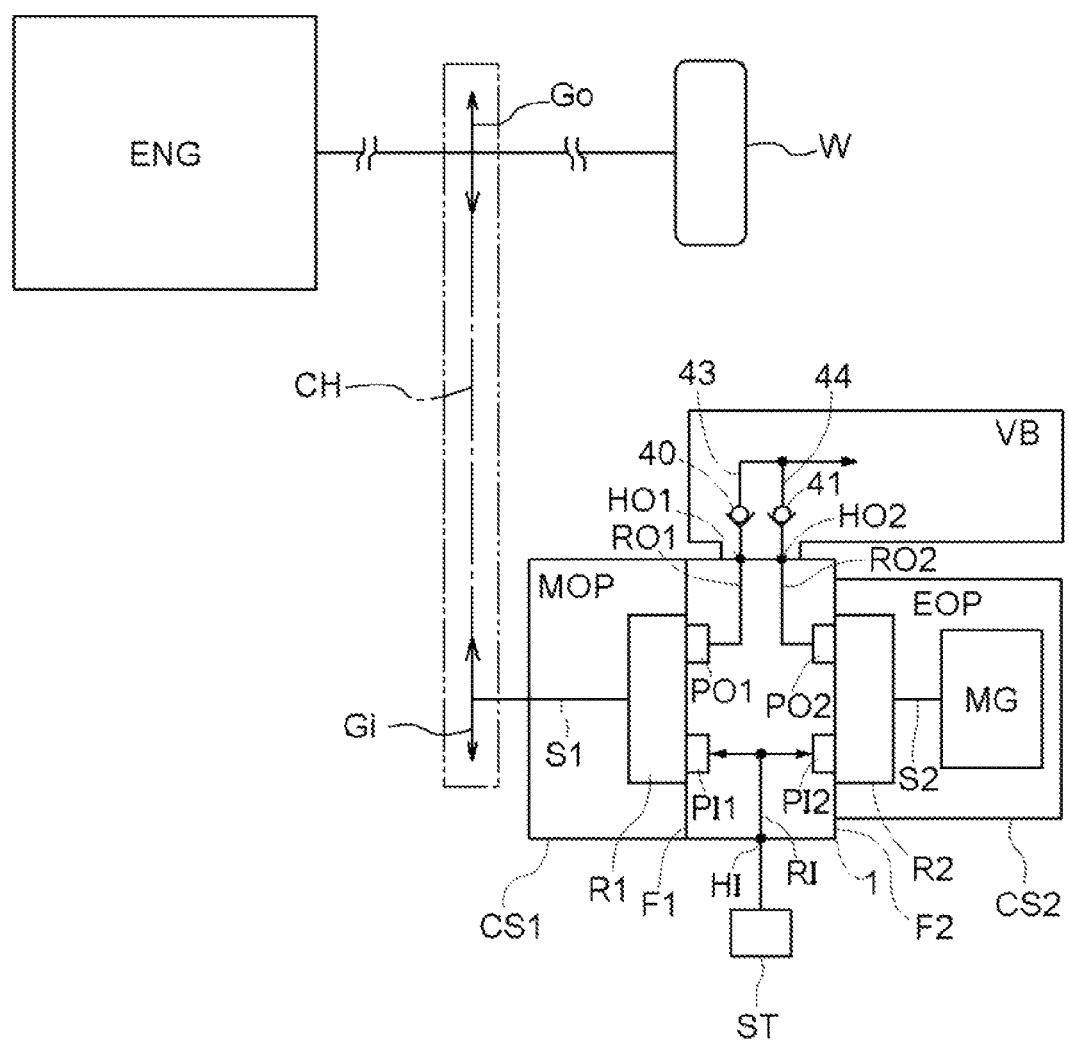
FIG. 1 schematically illustrates a configuration of an oil pump and an oil passage component member according to an embodiment of the present disclosure.

As illustrated in FIG. 1, the vehicle hydraulic supply apparatus 2 includes a mechanical oil pump MOP configured to be driven by a driving source of a wheel W, an electric oil pump EOP configured to be driven by an electric motor MG, and an oil passage component member 1 forming oil passages for the mechanical oil pump MOP and the electric oil pump EOP. In this embodiment, the driving source of the wheel W is an internal combustion engine ENG, and the mechanical oil pump MOP is configured to be driven by a driving force of the internal combustion engine ENG. FIG. 1 merely illustrates a coupling relationship among the members, and does not illustrate a specific layout of oil passages in the oil passage component member 1.

Figure 2:
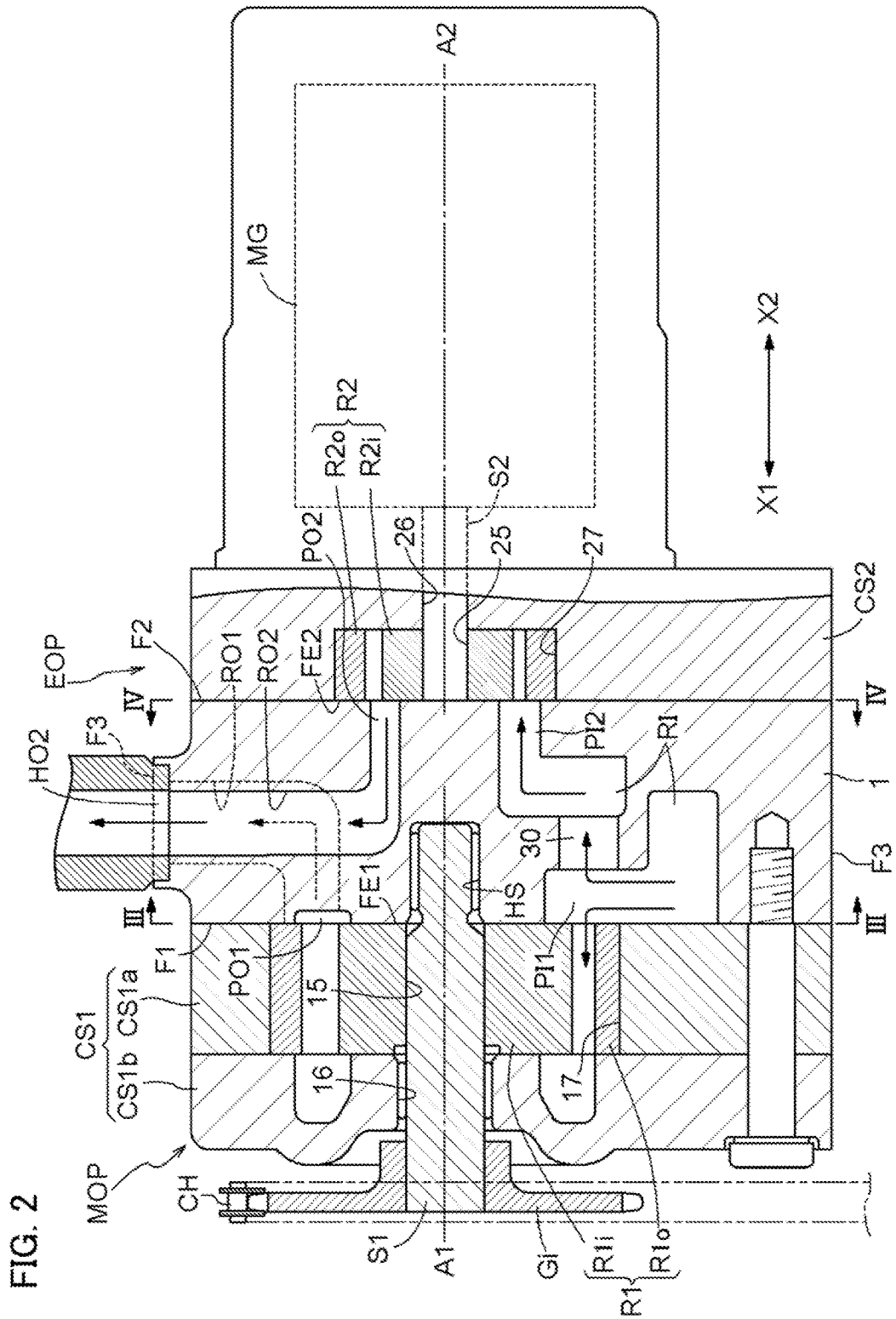
FIG. 2 is a cross sectional view in the axial direction of the oil pump and the oil passage component member according to the embodiment of the present disclosure.

As illustrated in FIG. 2, the oil passage component member 1 includes: a first surface F1 in contact with a first rotor R1 that is a pump rotor of the mechanical oil pump MOP; and a second surface F2 facing in a direction opposite to a direction in which the first surface F1 faces and being in contact with a second rotor R2 that is a pump rotor of the electric oil pump EOP. The oil passage component member 1 includes a suction oil passage and a discharge oil passage of the mechanical oil pump MOP which are located between the first surface F1 and the second surface F2, and a suction oil passage and a discharge oil passage of the electric oil pump EOP which are located between the first surface F1 and the second surface F2.

A rotation shaft center A1 (hereinafter referred to as a first rotation shaft center A1) of the first rotor R1 of the mechanical oil pump MOP is disposed parallel to a rotation shaft center A2 (hereinafter referred to as a second rotation shaft center A2) of the second rotor R2 of the electric oil pump EOP. Thus, the axial direction is common to these two rotation shaft centers A1 and A2. In the axial direction, a direction from the electric oil pump EOP to the mechanical oil pump MOP (the left side in FIG. 2) is defined as a first axial direction X1. A direction opposite to the first axial direction X1, which is a direction from the mechanical oil pump MOP to the electric oil pump EOP (the right in FIG. 2), is defined as a second axial direction X2. In this embodiment, the term "parallel" refers to a substantially parallel state including a small degree of inclination due to manufacturing errors.

Figure 3:
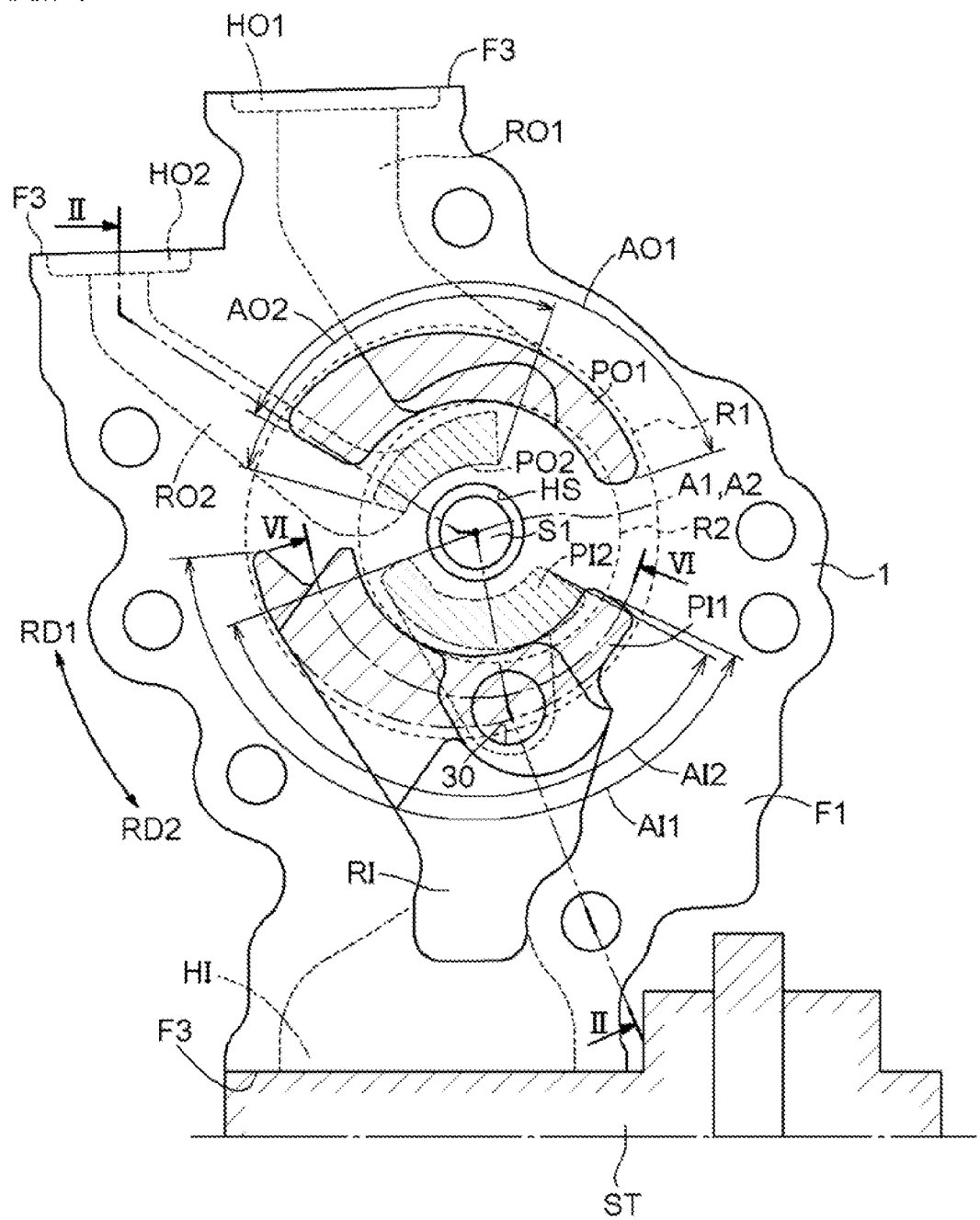
FIG. 3 illustrates the oil passage component member according to the embodiment of the present disclosure as viewed from a first surface side to a second surface side.

As illustrated in FIG. 3 seen in the second axial direction X2 and FIG. 4 seen in the first axial direction X1, a rotation direction RD1 (hereinafter referred to as a first rotation direction RD1) of the mechanical oil pump MOP is opposite to a rotation direction RD2 (hereinafter referred to as a second rotation direction RD2) of the electric oil pump EOP.

In this embodiment, the rotation shaft center A1 of the mechanical oil pump MOP is disposed close to the rotation shaft center A2 of the electric oil pump EOP. Specifically, the rotation shaft center A1 of the mechanical oil pump MOP overlaps a second rotation shaft S2 of the electric oil pump EOP as viewed from the axial direction. The rotation shaft center A2 of the electric oil pump EOP overlaps a first rotation shaft S1 of the mechanical oil pump MOP as viewed from the axial direction.

In this embodiment, the rotation shaft center A1 of the mechanical oil pump MOP and the rotation shaft center A2 of the electric oil pump EOP are coaxially disposed.

Configurations of the components will be described in detail below.

1. Mechanical Oil Pump MOP

The mechanical oil pump MOP is an oil pump that sucks oil from a first suction port PI1 and discharges oil to a first discharge port PO1 by rotation of the first rotor R1 under a driving force of the driving source of the wheel W.

Figure 5:
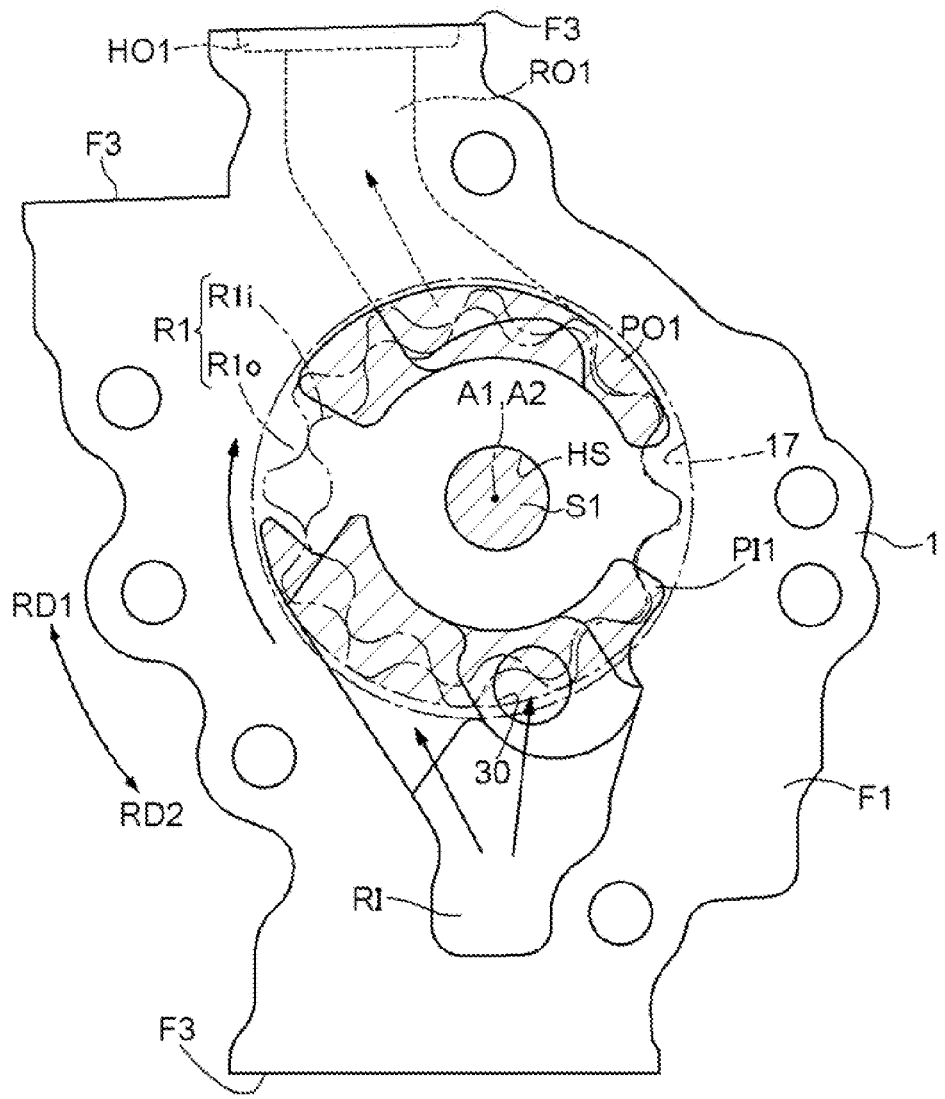
FIG. 5 is a view of overlapping a rotor of a mechanical oil pump with FIG. 3 in order to describe a relationship among a first suction port, a first discharge port, and the rotor of the mechanical oil pump according to the embodiment of the present disclosure.

In this embodiment, as illustrated in FIG. 5, the mechanical oil pump MOP is a gear pump, and includes a first rotor R1 constituted by a first outer rotor R1o having a gear on the inner side and a first inner rotor R1i disposed inside the first outer rotor R1o and having a gear on the outer side. The first outer rotor R1o and the first inner rotor R1i mesh with each other so as to be eccentrically disposed.

As illustrated in FIG. 2, the first rotor R1 is accommodated in a cylindrical first rotor housing chamber 17 formed in a first pump case member CS1. In this embodiment, an outer peripheral surface of the first outer rotor R1o is in contact with an inner peripheral surface of the first rotor housing chamber 17 so as to be rotatably supported. The axial length of the first rotor housing chamber 17 is equal to the axial length of the first rotor R1.

As illustrated in FIGS. 2 and 5, a center portion of the first inner rotor R1i has an axially extending through hole 15 through which the first rotation shaft S1 penetrates such that the first inner rotor R1i and the first rotation shaft S1 rotate as one unit. The rotation shaft center A1 of the mechanical oil pump MOP coincides with the rotation shaft center of the first rotation shaft S1.

An end portion of the first rotation shaft S1 projecting in the second axial direction X2 relative to the first rotor R1 is inserted into a shaft supporting hole HS formed in the first surface F1 of the oil passage component member 1 to be rotatably supported. The first pump case member CS1 covering a side of the first rotor R1 facing in the first axial direction X1 has an axially extending through hole 16 through which the first rotation shaft S1 penetrates such that the first rotation shaft S1 is rotatably supported.

The first pump case member CS1 includes a rotor housing case member CS1a forming an outer peripheral surface of the first rotor housing chamber 17 and a cover case member CS1b that contacts and covers, end surfaces of the first rotor R1 and the rotor housing case member CS1a facing in the first axial direction X1. The rotor housing case member CS1a is a member having the same axial length as that of the first rotor R1.

An end portion of the first rotation shaft S1 facing in the first axial direction X1 is coupled to an input gear Gi in such a manner that the first rotation shaft S1 and the input gear Gi rotate as one unit. In this embodiment, the input gear Gi is coupled, through a chain CH, to a drive gear Go (see FIG. 1) provided in a power transmission path connecting the internal combustion engine ENG and the wheel W.

2. Suction Port and Discharge Port of Mechanical Oil Pump MOP

As illustrated in FIGS. 2 and 3, the oil passage component member 1 includes the first surface F1 in contact with the first rotor R1 of the mechanical oil pump MOP. In this embodiment, the first surface F1 is in contact with an end face FE of the first rotor R1 facing in the second axial direction X2. In this embodiment, the first surface F2 is a flat surface orthogonal to the first rotation shaft center A1.

The first surface F1 includes a first suction port PI1 which is recessed toward the second surface F2 and through which oil is supplied to the mechanical oil pump MOP, and a first discharge port PO1 which is recessed toward the second surface F2 and through which oil is discharged from the mechanical oil pump MOP.

<First Suction Port PI1>

As illustrated in FIG. 3, the first surface F1 has the first suction port PI1 which is recessed toward the second surface F2 and through which oil is supplied to the mechanical oil pump MOP.

Figure 6:
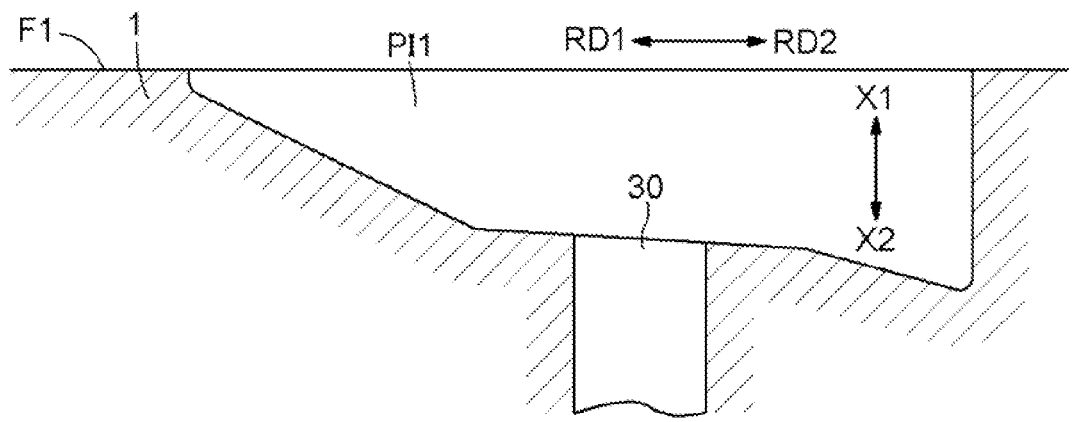
FIG. 6 is a cross sectional view in the axial direction of the first suction port according to the embodiment of the present disclosure.

The first rotation direction RD1 of the first rotor R1 of the mechanical oil pump MOP is clockwise as viewed from the second axial direction X2. As illustrated in FIG. 6, which is a cross section of the oil passage component member 1 along the circumferential direction and the axial direction of the first rotation shaft center A1, the first suction port PI1 has an inclined bottom surface, that is, has a shape in which the recess formed toward the second surface F2 gradually becomes shallower in the first rotation direction RD1 of the first rotor R1. Here, the depth of the recess formed toward the first surface F1 is the depth in the first axial direction X1 relative to the second surface F2. A portion of the recess that is formed in the first surface F1 on the discharge side and has the inclined bottom surface is the first suction port PI1. This inclined bottom surface enables oil to smoothly flow toward a clearance between the first outer rotor R1o and the first inner rotor R1i by rotation of the first rotor R1.

A communication passage 30, which is an oil passage, is formed so as to open in the inclined bottom surface of the first suction port PI1, and extends axially to communicate with the second suction port PI2.

As illustrated in FIG. 5, through the first suction port PI1, oil is supplied to the clearance between the first outer rotor R1o and the first inner rotor R1i in a region overlapping the first rotor housing chamber 17 as viewed from the axial direction. In a region overlapping the first rotor housing chamber 17 as viewed from the axial direction in the recess formed in the first surface F1 on the suction side, the first suction port PI1 is an arc-shaped region overlapping the clearance between the first outer rotor R1o and the first inner rotor R1i as viewed from the axial direction. The inclined bottom surface is disposed in this arc-shaped region. In this embodiment, the first suction port PI1 is an arc-shaped region that is included in the recess formed in the first surface F1 on the suction side, and overlaps, as viewed from the axial direction, a movement path of the clearance formed between the first outer rotor R1o and the first inner rotor R1i when the first rotor R1 rotates. In other words, the first suction port PI1 is an arc-shaped region that is included in the recess formed in the first surface F1 on the suction side, and overlaps, as viewed from the axial direction, a region between a root circle of the first outer rotor R1o and a root circle of the first inner rotor R1i. In each of FIGS. 5 and 3, a region corresponding to the first suction port PI1 is hatched. Here, the recess formed in the first surface F1 on the suction side refers to a recess communicating with the suction oil passage R1I.

The first suction port PI1 is formed into an arc shape (crescent shape) having an angular range AI1 of 90 degrees or more (about 120 degrees in this example) in the circumferential direction of the first rotation shaft center A1 as viewed from the axial direction (see FIG. 3). The radial width of the first suction port PI1 increases in the first rotation direction RD1 along the circumferential direction. Here, the arc-shaped region corresponding to the angular range AI1 is an arc-shaped region that is included in the recess formed in the first surface F1 on the suction side, and overlaps the clearance between the first outer rotor R1o and the first inner rotor R1i as viewed from the axial direction.

<First Discharge Port PO1>

As illustrated in FIG. 3, the first surface F1 has the first discharge port PO1 which is recessed toward the second surface F2 and through which oil is discharged from the mechanical oil pump MOP.

The first discharge port PO1 has an inclined bottom surface, that is, has a shape in which the recess formed toward the second surface F2 gradually becomes deeper in the first rotation direction RD1 of the first rotor R1. Here, the depth of the recess formed toward the second surface F2 is the depth in the second axial direction X2 relative to the first surface F1. A portion of the recess that is formed in the first surface F1 on the discharge side and has the inclined bottom surface is the first discharge port PO1. This inclined bottom surface enables oil to smoothly flow toward the first discharge oil passage RO1 by rotation of the first rotor R1.

As illustrated in FIG. 5, through the first discharge port PO1, oil is discharged from the clearance between the first outer rotor R1o and the first inner rotor R1i in a region overlapping the first rotor housing chamber 17 as viewed from the axial direction. In a region overlapping the first rotor housing chamber 17 as viewed from the axial direction in the recess formed in the first surface F1 on the discharge side, the first discharge port PO1 is an arc-shaped region overlapping the clearance between the first outer rotor R1o and the first inner rotor R1i as viewed from the axial direction. The inclined bottom surface is provided in this arc-shaped region. In this embodiment, the first discharge port PO1 is an arc-shaped region that is included in the recess formed in the first surface F1 on the discharge side, and overlaps, as viewed from the axial direction, a movement path of the clearance formed between the first outer rotor R1o and the first inner rotor R1i when the first rotor R1 rotates. In other words, the first discharge port PO1 is an arc-shaped region that is included in the recess formed in the first surface F1 on the discharge side, and overlaps, as viewed from the axial direction, the region between the root circle of the first outer rotor R1o and the root circle of the first inner rotor R1i. In each of FIGS. 5 and 3, a region corresponding to the first discharge port PO1 is hatched. Here, the recess formed in the first surface F1 on the discharge side refers to a recess communicating with the first discharge oil passage RO1.

The first discharge port PO1 is formed into an arc shape (crescent shape) having an angular range AO1 of 90 degrees or more (about 120 degrees in this example) in the circumferential direction of the first rotation shaft center A1 as viewed from the axial direction (see FIG. 3). The radial width of the first discharge port PO1 decreases in the first rotation direction RD1 along the circumferential direction. Here, the arc-shaped region serving as the angular range AO1 is an arc-shaped region that is included in the recess formed in the first surface F1 on the discharge side and overlaps the clearance between the first outer rotor R1o and the first inner rotor R1i as viewed from the axial direction.

3. Electric Oil Pump EOP

The electric oil pump EOP is an oil pump that sucks oil from the second suction port PI2 and discharges oil to the second discharge port PO2 by rotating the second rotor R2 by a driving force of the electric motor MG.

Figure 7:
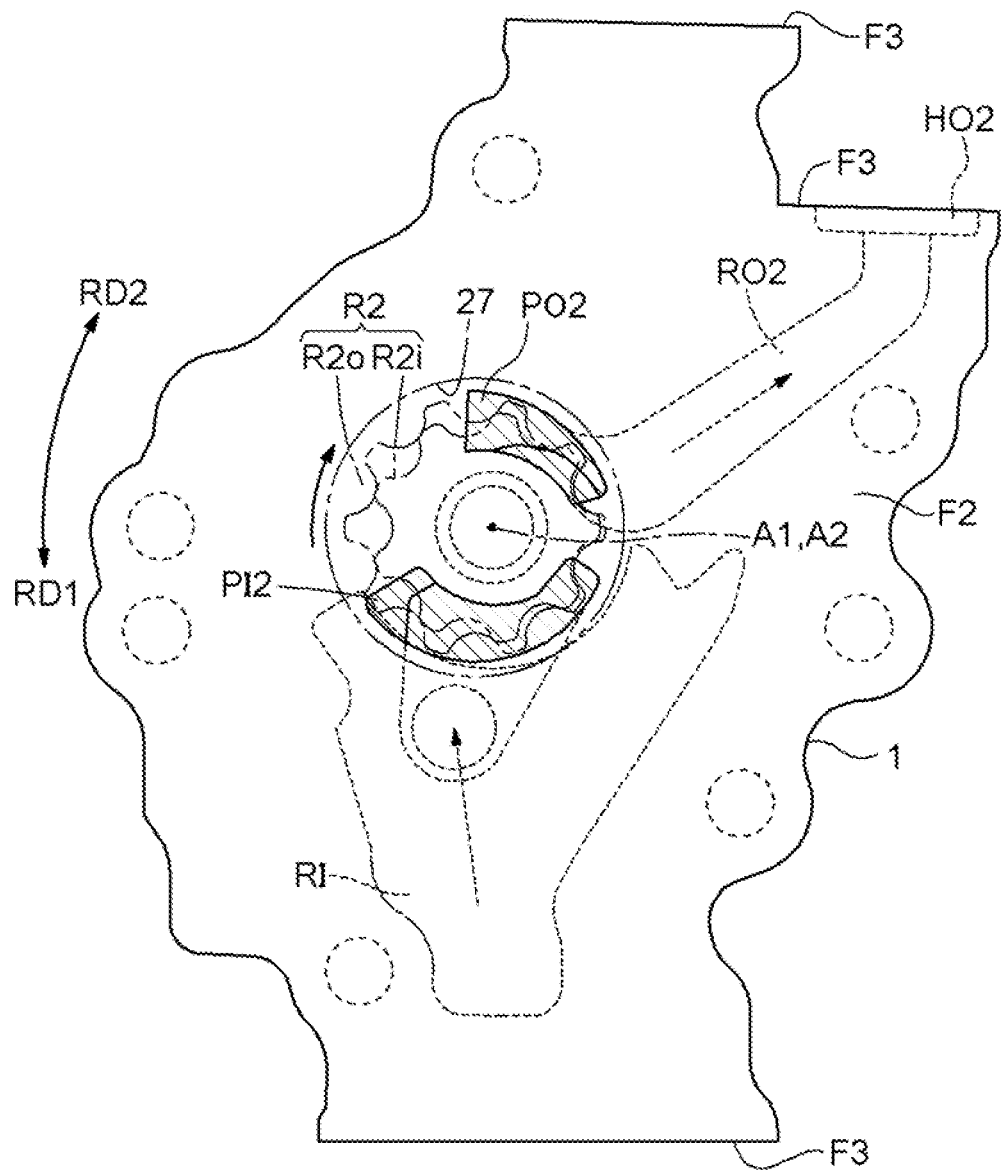
FIG. 7 is a view overlapping of a rotor of an electric oil pump with FIG. 4 in order to describe a relationship among a second suction port, a second discharge port, and the rotor of the electric oil pump according to the embodiment of the present disclosure.

In this embodiment, as illustrated in FIG. 7, the electric oil pump EOP is a gear pump, and includes a second rotor R2 constituted by a second outer rotor R2o having a gear on the inner side and a second inner rotor R2i disposed inside the second outer rotor R2o and having a gear on the outer side. The second outer rotor R2o and the second inner rotor R2i mesh with each other so as to be eccentrically disposed.

As illustrated in FIG. 2, the second rotor R2 is accommodated in a cylindrical second rotor housing chamber 27 formed in a second pump case member CS2. In this embodiment, an outer peripheral surface of the second outer rotor R2o is in contact with an inner peripheral surface of the second rotor housing chamber 27 so as to be rotatably supported. The axial length of the second rotor housing chamber 27 is equal to the axial length of the second rotor R2.

As illustrated in FIG. 2, a center portion of the second inner rotor R2i has an axially extending through hole 25 through which the second rotation shaft S2 penetrates such that the second inner rotor R2i and the second rotation shaft S2 rotate as one unit. The rotation shaft center A2 of the electric oil pump EOP coincides with the rotation shaft center of the second rotation shaft S2.

The second pump case member CS2 covering a side of the second rotor R2 facing in the second axial direction X2 has an axially extending through hole 26 through which the second rotation shaft S2 penetrates such that the second rotation shaft S2 is rotatably supported.

An end portion of the second rotation shaft S2 facing in the second axial direction X2 is coupled to a rotor of the electric motor MG such that the second rotation shaft S2 and the rotor rotate as one unit. The electric motor MG functions as a motor (electric motor) that generates power upon receiving electric power from, for example, a battery.

4. Suction Port and Discharge Port of Electric Oil Pump EOP

As illustrated in FIG. 2, the oil passage component member 1 includes the second surface F2 facing in a direction opposite to a direction in which the first surface F1 faces and being in contact with the second rotor R2 of the electric oil pump EOP. In this embodiment, the second surface F2 is in contact with an end face FE2 of the second rotor R2 facing in the first axial direction X1. In this embodiment, the second surface F2 is a flat surface orthogonal to the second rotation shaft center A2 and is parallel to the first surface F1.

Figure 4:
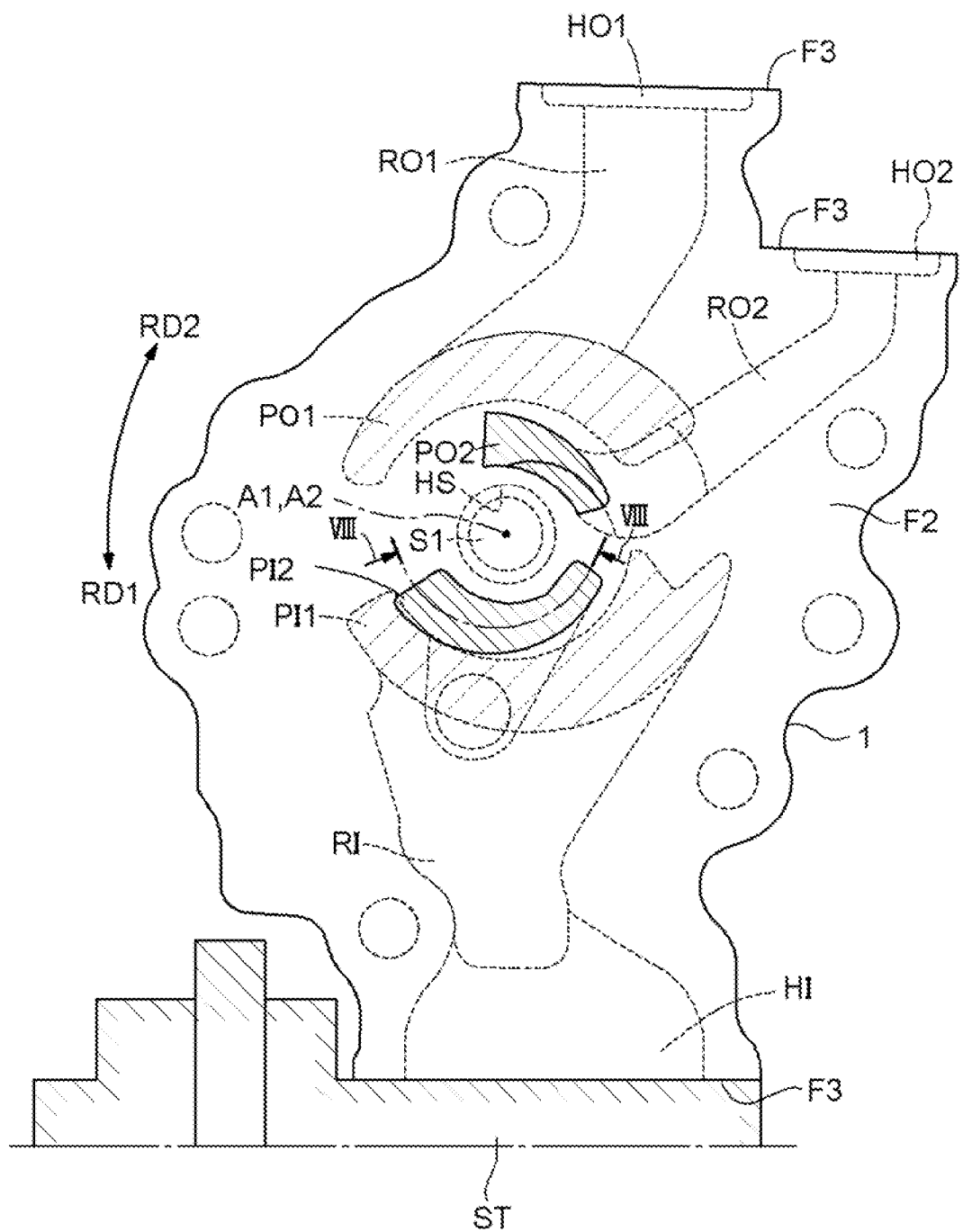
FIG. 4 illustrates the oil passage component member according to the embodiment of the present disclosure as viewed from the second surface side to the first surface side.

As illustrated in FIG. 4, the second surface F2 includes a second suction port PI2 which is recessed toward the first surface F1 and through which oil is supplied to the electric oil pump EOP, and a second discharge port PO2 which is recessed toward the first surface F1 and through which oil is discharged from the electric oil pump EOP.

<Second Suction Port PI2>

As illustrated in FIG. 4, the second surface F2 has the second suction port PI2 which is recessed toward the first surface F1 and through which oil is supplied to the electric oil pump EOP.

The second rotation direction RD2 of the second rotor R2 of the electric oil pump EOP is clockwise as viewed from the first axial direction X1. The second rotation direction RD2 of the electric oil pump EOP is counterclockwise as viewed from the second axial direction X2. Thus, the second rotation direction RD2 of the electric oil pump EOP is opposite to the first rotation direction RD1 of the mechanical oil pump MOP.

Figure 8:
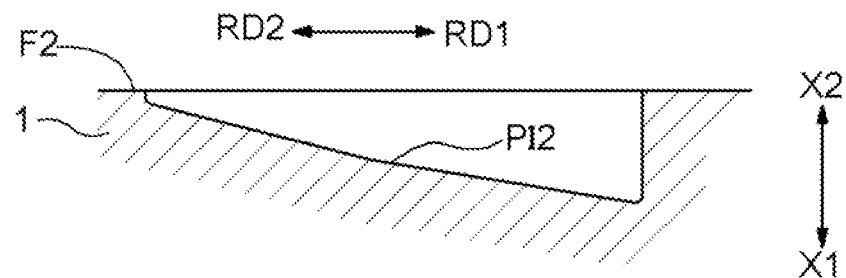
FIG. 8 is a cross sectional view in the axial direction of the second suction port according to the embodiment of the present disclosure.

As illustrated in a cross section of the oil passage component member 1 along the circumferential direction and the axial direction of the second rotation shaft center A2 in FIG. 8, the second suction port PI2 has an inclined bottom surface, that is, has a shape in which the recess formed toward the first surface F1 gradually becomes shallower in the second rotation direction RD2 of the second rotor R2. A portion of the recess that is formed in the second surface F2 on the suction side and has the inclined bottom surface is the second suction port PI2. This inclined bottom surface enables oil to smoothly flow toward a clearance between the second outer rotor R2o and the second inner rotor R2i by rotation of the second rotor R2.

As illustrated in FIG. 7, through the second suction port PI2, oil is supplied to the clearance between the second outer rotor R2o and the second inner rotor R2i in a region overlapping the second rotor housing chamber 27 as viewed from the axial direction. In a region that is included in the recess formed in the second surface F2 on the suction side and overlaps the second rotor housing chamber 27 as viewed from the axial direction, the second suction port PI2 is an arc-shaped region overlapping the clearance between the second outer rotor R2o and the second inner rotor R2i as viewed from the axial direction. The inclined bottom surface is provided in this arc-shaped region. In this embodiment, the second suction port PI2 is an arc-shaped region that is included in the recess formed in the second surface F2 on the suction side, and overlaps, as viewed from the axial direction, a movement path of the clearance formed between the second outer rotor R2o and the second inner rotor R2i when the second rotor R2 rotates. In other words, the second suction port PI2 is an arc-shaped region that is included in the recess formed in the second surface F2 on the suction side and overlaps, as viewed from the axial direction, a region between a root circle of the second outer rotor R2o and a root circle of the second inner rotor R2i. In each of FIGS. 7 and 3, a region corresponding to the second suction port PI2 is hatched. Here, the recess formed in the second surface F2 on the suction side refers to a recess communicating with the suction oil passage RI.

The second suction port PI2 is formed into an arc shape (crescent shape) having an angular range AI2 of 90 degrees or more (about 120 degrees in this example) in the circumferential direction of the second rotation shaft center A2 as viewed from the axial direction (see FIG. 3). The radial width of the second suction port PI2 increases in the second rotation direction RD2 along the circumferential direction. Here, the arc-shaped region serving as the angular range AI2 is an arc-shaped region that is included in the recess formed in the second surface F2 on the suction side and overlaps the clearance between the second outer rotor R2o and the second inner rotor R2i as viewed from the axial direction.

<Second Discharge Port PO2>

As illustrated in FIG. 4, the second surface F2 has the second discharge port PO2 which is recessed toward the first surface F1 and through which oil is discharged from the electric oil pump EOP.

The second discharge port PO2 has an inclined bottom surface, that is, has a shape in which the recess formed toward the first surface F1 gradually becomes deeper in the second rotation direction RD2 of the second rotor R2. A portion of the recess that is formed in the second surface F2 on the discharge side and has the inclined bottom surface is the second discharge port PO2. This inclined bottom surface enables oil to smoothly flow toward the second discharge oil passage RO2 by rotation of the second rotor R2.

As illustrated in FIG. 7, through the second discharge port PO2, oil is discharged from the clearance between the second outer rotor R2o and the second inner rotor R2i in a region overlapping the second rotor housing chamber 27 as viewed from the axial direction. In a region that is included in the recess formed in the second surface F2 on the discharge side and overlaps the second rotor housing chamber 27 as viewed from the axial direction, the second discharge port PO2 is an arc-shaped region overlapping the clearance between the second outer rotor R2o and the second inner rotor R2i as viewed from the axial direction. The inclined bottom surface is provided in this arc-shaped region. In this embodiment, the second discharge port PO2 is an arc-shaped region that is included in the recess formed in the second surface F2 on the discharge side, and overlaps, as viewed from the axial direction, a movement path of the clearance formed between the second outer rotor R2o and the second inner rotor R2i when the second rotor R2 rotates. In other words, the second discharge port PO2 is an arc-shaped region that is included in the recess formed in the second surface F2 on the discharge side and overlaps a region between the root circle of the second outer rotor R2o and the root circle of the second inner rotor R2i as viewed from the axial direction. In each of FIGS. 7 and 3, a region corresponding to the second discharge port PO2 is hatched. Here, the recess formed in the second surface F2 on the discharge side refers to a recess communicating with the second discharge oil passage RO2.

The second discharge port PO2 is formed into an arc shape (crescent shape) having an angular range AO2 of 90 degrees or more (about 90 degrees in this example) in the circumferential direction of the second rotation shaft center A2 as viewed from the axial direction (see FIG. 3). The radial width of the second discharge port PO2 decreases in the second rotation direction RD2 along the circumferential direction. Here, the arc-shaped region serving as the angular range AO2 is an arc-shaped region that is included in the recess formed in the second surface F2 on the discharge side and overlaps the clearance between the second outer rotor R2o and the second inner rotor R2i as viewed from the axial direction.

5. Suction Oil Passage RI

The oil passage component member 1 includes a suction oil passage for supplying oil to the mechanical oil pump MOP and a suction oil passage for supplying oil to the electric oil pump EOP.

In this embodiment, as illustrated in FIGS. 1 and 2, an upstream end portion of the suction oil passage for the mechanical oil pump MOP and an upstream end portion of the suction oil passage for the electric oil pump are provided as a common suction oil passage RI. That is, the suction oil passage RI is shared by the mechanical oil pump MOP and the electric oil pump EOP. The suction oil passage RI communicates with both the first suction port PI1 and the second suction port PI2 to be used for supplying oil thereto.

In this embodiment, as illustrated in FIG. 3, the suction oil passage RI is partially open to the first surface F1 in a region connected to the first suction port PI1. The communication passage 30 connecting the suction oil passage RI to the second suction port PI2 is an axially extending cylindrical hole, and partially overlaps the first suction port PI1 as viewed from the axial direction.

As illustrated in FIG. 3, the angular range AI1 including the first suction port PI1 with respect to the rotation shaft center A1 of the mechanical oil pump MOP and the angular range AI2 including the second suction port PI2 with respect to the rotation shaft center A2 of the electric oil pump EOP overlap each other.

Thus, the length of the suction oil passage RI communicating with the first suction port PI1 and the second suction port PI2 can be reduced, and the shape thereof can be simplified.

The suction oil passage RI extends from the first suction port PI1 and the second suction port PI2 outward in the radial direction of the first rotation shaft center A1 and the second rotation shaft center A2. The suction oil passage RI is disposed in an angular range overlapping the angular range AI2 including the second suction port PI2 and the angular range AI1 including the first suction port PI1.

Thus, the suction oil passage RI extending from the first suction port PI1 and the second suction port PI2 can be shortened.

An outer peripheral surface F3 of a portion connecting the first surface F1 and the second surface F2 has a suction end opening HI that is an end opening of the suction oil passage RI. The suction end opening HI is an end opening shared by the suction oil passage of the mechanical oil pump MOP and the suction oil passage of the electric oil pump EOP. A strainer ST is connected to the suction end opening HI and disposed in an oil reservoir such as an oil pan. A portion of the outer peripheral surface F3 having the suction end opening HI is a flat surface parallel to the axial direction. An opening end face of the suction end opening HI is parallel to the axial direction. The suction end opening HI is open radially outward. The suction oil passage RI is connected to the first suction port PI1, and is connected to the second suction port PI2 through the communication passage 30 that is open to the first suction port PI1.

6. Discharge Oil Passage

The oil passage component member 1 has a discharge oil passage for transferring oil discharged from the mechanical oil pump MOP and a discharge oil passage for transferring oil discharged from the electric oil pump EOP. In this embodiment, as illustrated in FIGS. 1 to 3, the discharge oil passage (hereinafter referred to as a first discharge oil passage RO1) of the mechanical oil pump MOP and the discharge oil passage (hereinafter referred to as a second discharge oil passage RO2) of the electric oil pump EOP are independent of each other. The term "independent" herein refers to a configuration in which the first discharge oil passage RO1 and the second discharge port PO2 do not communicate with each other in the oil passage component member 1.

As illustrated in FIG. 3, as viewed from the second axial direction X2, the first rotation direction RD1 of the first rotor R1 and the second rotation direction RD2 of the second rotor R2 are opposite to each other. Thus, a portion where the first discharge oil passage RO1 is connected to the first discharge port PO1 is disposed forward of the first discharge port PO1 in the first rotation direction RD1, and a portion where the second discharge oil passage RO2 is connected to the second discharge port PO2 is disposed forward of the second discharge port PO2 in the second rotation direction RD2.

That is, the second discharge oil passage RO2 can be disposed on the side in the second rotation direction RD2 with respect to the first discharge oil passage RO1, so that overlapping between the first discharge oil passage RO1 and the second discharge oil passage RO2 as viewed from the axial direction can be easily avoided.

In this manner, in a region radially outward of the first rotor R1 of the mechanical oil pump MOP and the second rotor R2 of the electric oil pump EOP, the first discharge oil passage RO1 and the second discharge oil passage RO2 do not overlap each other as viewed from the axial direction of the rotation shaft centers A1 and A2 of the two rotors. As illustrated in FIG. 2, the first discharge oil passage RO1 and the second discharge oil passage RO2 overlap each other as viewed from the circumferential direction of the rotation shaft centers A1 and A2 of the two rotors. In this embodiment, the first discharge oil passage RO1 and the second discharge oil passage RO2 are formed so as not to entirely overlap each other as viewed from the axial direction of the rotation shaft centers A1 and A2 of the two rotors. Thus, in this configuration, the width (the axial length) of the oil passage component member 1 can be reduced.

As described above, the angular range AI1 including the first suction port PI1 and the angular range AI2 including the second suction port PI2 overlap each other. Thus, the angular range AO1 including the first discharge port PO1 with respect to the rotation shaft center A1 of the mechanical oil pump MOP and the angular range A02 including the second suction port PI2 with respect to the rotation shaft center A2 of the electric oil pump EOP overlap each other.

Since the second rotor R2 has a diameter smaller than the first rotor R1, the second suction port PI2 and the second discharge port PO2 are disposed radially inward of the first suction port PI1 and the first discharge port PO1 as viewed from the axial direction. Thus, overlapping between the first discharge port PO1 and the second discharge port PO2 and overlapping between the first discharge oil passage RO1 and the second discharge oil passage RO2 in the axial direction can be suppressed. In addition, it is possible to suppress interference between each of the ports on the suction side, and each of the ports on the discharge side, and to determine the depth of each of the ports in the axial direction. In this manner, an increase in the width (the axial length) of the oil passage component member 1 can be reduced.

As illustrated in FIGS. 2 and 3, the outer peripheral surface F3 connecting the first surface F1 and the second surface F2 has a first discharge end opening HO1 that is an end opening of the first discharge oil passage RO1 and a second discharge end opening HO2 that is an end opening of the second discharge oil passage RO2.

The first discharge end opening HO1 and the second discharge end opening HO2 are disposed in such a manner that the first discharge end opening HO1 and the second discharge end opening HO2 are disposed at different locations as viewed from the axial direction of the rotation shaft center of the first rotor R1 of the mechanical oil pump MOP or the second rotor R2 of the electric oil pump EOP, and overlap each other as viewed from the circumferential direction of this rotation shaft center. The second discharge end opening HO2 is disposed on the side in the second rotation direction RD2 along the circumferential direction with respect to the first discharge end opening HO1. This configuration allows the width (the axial length) of the oil passage component member 1 to be reduced.

Portions of the outer peripheral surface F3 including the first discharge end opening HO1 and the second discharge end opening HO2 are parallel to each other and are flat surfaces that are parallel to the axial direction. Thus, the opening end faces of the first discharge end opening HO1 and the second discharge end opening HO2 are parallel to each other, and are parallel to the axial direction. Each of the first discharge end opening HO1 and the second discharge end opening HO2 is open radially outward.

The first discharge end opening HO1 and the second discharge end opening HO2 are open in a direction opposite to a direction in which the suction end opening HI is open.

The opening end faces of the first discharge end opening HO1 and the second discharge end opening HO2 are parallel to the opening end face of the suction end opening HI.

As illustrated in FIG. 1, each of the first discharge end opening HO1 and the second discharge end opening HO2 is connected to a connection oil passage for connecting each of the first discharge end opening HO1 and the second discharge end opening HO2 to a valve body VB. The valve body VB forms a housing chamber that houses an oil passage for adjusting a hydraulic pressure to be supplied to objects in a vehicle transfer device, such as a clutch of a transmission device, and a hydraulic control valve for controlling the hydraulic pressure for the adjustment. In this embodiment, the first discharge end opening HO1 and the second discharge end opening HO2 are directly joined to the end opening of the first oil passage 43 and the end opening of the second oil passage 44 included in the valve body VB, and the first discharge oil passage RO1 and the second discharge oil passage RO2 are respectively connected to the first oil passage 43 and the second oil passage 44 of the valve body VB.

The first discharge oil passage RO1 and the second discharge oil passage RO2 are combined in the valve body VB. That is, the first oil passage 43 connected to the first discharge oil passage RO1 and the second oil passage 44 connected to the second discharge oil passage RO2 are combined in the valve body VB.

The first oil passage 43 includes a first check valve 40 that is a check valve for preventing backflow to the first rotor R1, and the second oil passage 44 includes a second check valve 41 that is a check valve for preventing backflow to the second rotor R2. That is, the first check valve 40 and the second check valve 41 are not provided in the oil passage component member 1 but are provided in the valve body VB. Since the first check valve 40 and the second check valve 41 are provided outside the oil passage component member 1, an increase in the width (the axial length) of the oil passage component member 1 can be suppressed.

[Other Embodiments]

Lastly, other embodiments of the present disclosure will be described. The constitution of each embodiment described herein is not limited to being applied in an individual manner, and may be applied in combination with the constitution of other embodiments unless an inconsistency occurs.

(1) In the embodiment described above, the internal combustion engine ENG as a driving source of the wheel W is provided. However, the embodiments of the present disclosure are not limited to this example. That is, in addition to the internal combustion engine ENG, an electric motor having functions of an electric motor and a power generator may be provided as a driving source of the wheel W. Alternatively, as a driving source of the wheel W, the internal combustion engine ENG may be replaced by an electric motor.

Figure 11:
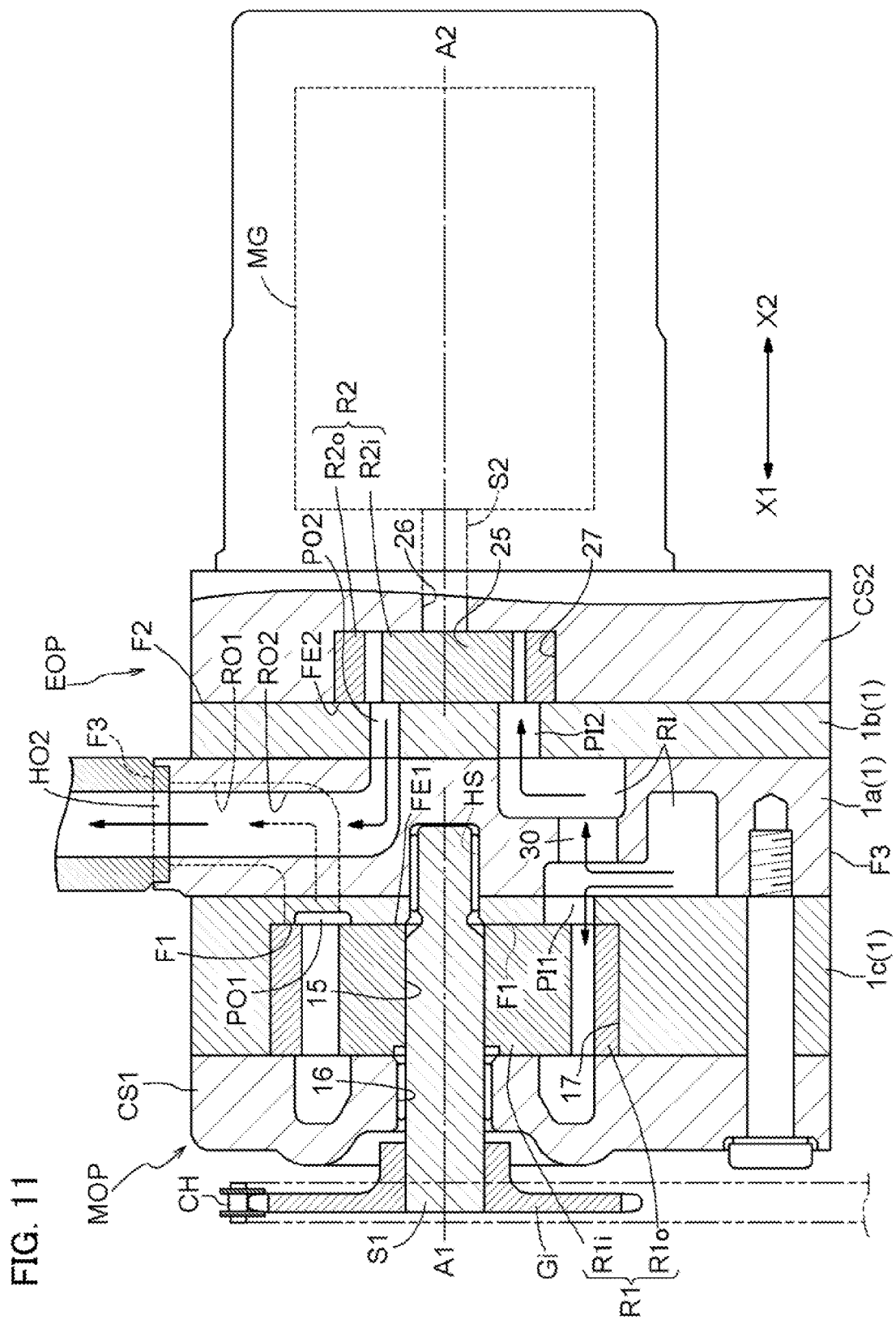
FIG. 11 is a cross sectional view in the axial direction of an oil pump and an oil passage component member according to another embodiment of the present disclosure.

(2) In the embodiment described above, the oil passage component member 1 is constituted by one member. However, the embodiments of the present disclosure are not limited to this example. That is, as illustrated in FIG. 11, the oil passage component member 1 may be constituted by three members: a first member 1b on the side in the first axial direction X1; a second member 1c on the side in the second axial direction X2; and an intermediate member 1a between the first member 1b and the second member 1c in the axial direction.

The first member 1b includes the second surface F2 in contact with the axial end face FE2 of the second rotor R2 of the electric oil pump EOP, and includes parts of the second suction port PI2 and the second discharge port PO2. In the example illustrated in FIG. 11, the second member 1c is formed as one unit with the second pump case member CS2 in the embodiment described above. That is, a member corresponding to the second pump case member CS2 of the embodiment described above is included in the oil passage component member 1. The second member 1c includes the first surface F1 in contact with the axial end face FE1 of the first rotor R1 of the mechanical oil pump MOP, and includes parts of the first suction port PI1 and the first discharge port PO1. The intermediate member 1a includes the suction oil passage RI, the first discharge oil passage RO1, the second discharge oil passage RO2, parts of the suction ports PI1 and PI2, and parts of the discharge ports PO1 and PO2, for example.

In this manner, components of the oil passage component member 1 are provided as separate parts, so that performance of only the electric oil pump EOP can be evaluated in a state where only the first member 1b is attached to the electric oil pump EOP and the second suction port PI2 and the second discharge port PO2 are disposed in the electric oil pump EOP, for example. Alternatively, performance of only the mechanical oil pump MOP can be evaluated in a state where only the second member 1c is attached to the mechanical oil pump MOP and the first suction port PI1 and the first discharge port PO1 are provided in the mechanical oil pump MOP.

Figure 12:
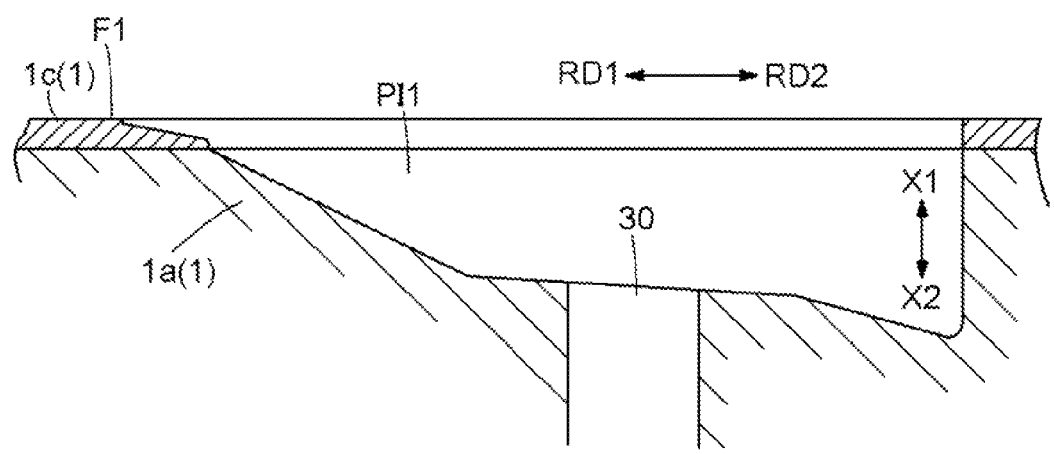
FIG. 12 is a cross sectional view in the axial direction of a first suction port according to another embodiment of the present disclosure.

FIG. 12 illustrates a cross section corresponding to the cross section of the first suction port PI1 of the embodiment described above illustrated in FIG. 6. As illustrated in FIG. 12, the first suction port PI1 has an inclined bottom surface, that is, has a shape in which a recess formed toward the second surface F2 gradually becomes shallower in the first rotation direction RD1 of the first rotor R1. The inclined bottom surface is provided across the second member 1c and the intermediate member 1a. The oil passage component member 1 may be configured such that the first member 1b and the intermediate member 1a are formed as one unit, and the second member 1c is formed as a member separate from the first member 1b and the intermediate member 1a. Alternatively, the oil passage component member 1 may be configured such that the second member 1c and the intermediate member 1a are formed as one unit, and the first member 1b is formed as a member separate from the second member 1c and the intermediate member 1a.

(3) In the embodiment described above, the first rotation shaft center A1 coincides with and is parallel to the second rotation shaft center A2. However, the embodiments of the present disclosure are not limited to this example. That is, the first rotation shaft center A1 and the second rotation shaft center A2 may be configured to be parallel to each other but not to coincide with each other. Alternatively, the first rotation shaft center A1 and the second rotation shaft center A2 may be configured not to be parallel to each other but to be oriented in intersecting directions (including three-dimensional intersection). The first surface F1 and the second surface F2 may also be configured not to be in parallel to each other but to be oriented in intersecting directions.

(4) In the embodiment described above, the suction oil passage RI is partially open to the first surface F1 in a region connected to the first suction port PI1. However, the embodiments of the present disclosure are not limited to this example. That is, the suction oil passage RI may be configured not to open to the first surface F1. The suction oil passage RI, the first discharge oil passage RO1, and the second discharge oil passage RO2 may be configured to open to the first surface F1 or the second surface F2 at any location.

(5) In the embodiment described above, the first discharge oil passage RO1 and the second discharge oil passage RO2 are independent of each other. However, the embodiments of the present disclosure are not limited to this example. That is, the first discharge oil passage RO1 and the second discharge oil passage RO2 may communicate with each other through a check valve, for example, in the oil passage component member 1.

(6) In the embodiment described above, in a region radially outward of both a rotor Rm of the mechanical oil pump MOP and a rotor Re of the electric oil pump EOP, the first discharge oil passage RO1 and the second discharge oil passage RO2 do not overlap each other as viewed from the axial direction of the rotation shaft centers of the two rotors, and overlap each other as viewed from the circumferential direction of the rotation shaft centers thereof. However, the embodiments of the present disclosure are not limited to this example. That is, in the region radially outward, the first discharge oil passage RO1 and the second discharge oil passage RO2 may overlap each other as viewed from the axial direction of the rotation shaft centers of the two rotors, while the first discharge oil passage RO1 and the second discharge oil passage RO2 may not overlap each other as viewed from the circumferential direction of the rotation shaft centers thereof.

(7) In the embodiment described above, the angular range AI1 including the first suction port PI1 and the angular range AI2 including the second suction port PI2 overlap each other. However, the embodiments of the present disclosure are not limited to this example. That is, the angular range AI1 including the first suction port PI1 and the angular range AI2 including the second suction port PI2 may not overlap each other.

Figure 9:
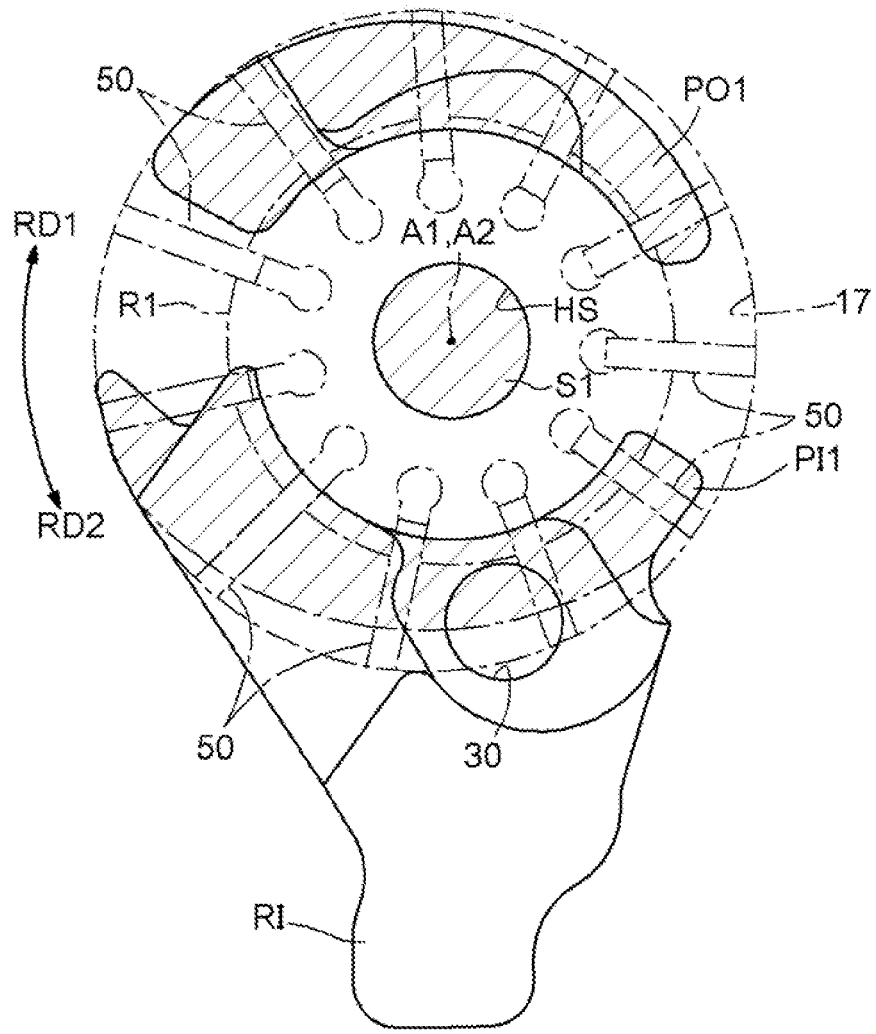
FIG. 9 illustrates an oil passage component member as viewed from a first surface side to a second surface side in order to describe a relationship among a first suction port, a first discharge port, and a rotor of a mechanical oil pump according to another embodiment of the present disclosure.

(8) In the embodiment described above, the mechanical oil pump MOP is a gear pump (trochoid pump). However, the embodiments of the present disclosure are not limited to this example. That is, the mechanical oil pump MOP may be a vane pump as illustrated in FIG. 9. The first rotor R1 includes a plurality of vanes 50 that are arranged at regular intervals in the circumferential direction. In each of the vanes 50, a radial projection amount from a rotor body portion varies in such a manner that the vane 50 comes into contact with an inner peripheral surface of the first rotor housing chamber 17.

The first suction port PI1 is an arc-shaped region that is included in the recess formed in the first surface F1 on the suction side and overlaps a region between the inner peripheral surface of the first rotor housing chamber 17 and an outer peripheral surface of the first rotor R1 as viewed from the axial direction.

The first discharge port PO1 is an arc-shaped region that is included in the recess formed in the first surface F1 on the discharge side and overlaps the region between the inner peripheral surface of the first rotor housing chamber 17 and the outer peripheral surface of the first rotor R1 as viewed from the axial direction.

Figure 10:
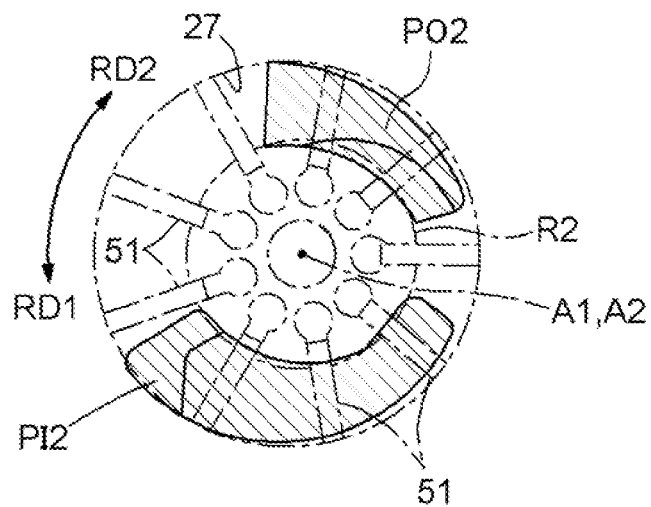
FIG. 10 illustrates an oil passage component member as viewed from a first surface side to a second surface side in order to describe a relationship among a second suction port, a second discharge port, and a rotor of an electric oil pump according to another embodiment of the present disclosure.

(9) In the embodiment described above, the electric oil pump EOP is a gear pump (trochoid pump). However, the embodiments of the present disclosure are not limited to this example. That is, the electric oil pump EOP may be a vane pump as illustrated in FIG. 10. The second rotor R2 includes a plurality of vanes 51 that are arranged at regular intervals in the circumferential direction. In each of the vanes 51, a radial projection amount from a rotor body portion varies in such a manner that the vane 51 comes into contact with an inner peripheral surface of the second rotor housing chamber 27.

The second suction port PI2 is an arc-shaped region that is included in the recess formed in the second surface F2 on the suction side and overlaps a region between the inner peripheral surface of the second rotor housing chamber 27 and an outer peripheral surface of the second rotor R2 as viewed from the axial direction.

The second discharge port PO2 is an arc-shaped region that is included in the recess formed in the second surface F2 on the discharge side and overlaps the region between the inner peripheral surface of the second rotor housing chamber 27 and the outer peripheral surface of the second rotor R2 as viewed from the axial direction.

(10) In the embodiment described above, the strainer ST is directly connected to the suction end opening HI. However, the embodiments of the present disclosure are not limited to this example. That is, the strainer ST may be connected to the suction end opening HI through an oil passage formed in another member, for example.

(11) In the embodiment described above, the rotation shaft center A1 of the mechanical oil pump MOP and the rotation shaft center A2 of the electric oil pump EOP are coaxially disposed. However, the embodiments of the present disclosure are not limited to this example. That is, the rotation shaft center A1 of the mechanical oil pump MOP and the rotation shaft center A2 of the electric oil pump EOP may be disposed on a different axis. For example, the rotation shaft center A1 of the mechanical oil pump MOP may be displaced from the rotation shaft center A2 of the electric oil pump EOP in a range overlapping the electric oil pump EOP as viewed from the axial direction. The rotation shaft center A2 of the electric oil pump EOP may be displaced from the rotation shaft center A1 of the mechanical oil pump MOP in a range overlapping the mechanical oil pump MOP as viewed from the axial direction.

(12) In the embodiment described above, the second rotor R2 of the electric oil pump EOP completely overlaps the first rotor R1 of the mechanical oil pump MOP as viewed from the axial direction. Alternatively, the second rotor R2 of the electric oil pump EOP may overlap a part of the first rotor R1 of the mechanical oil pump MOP as viewed from the axial direction.

(13) In the embodiment described above, each of the mechanical oil pump MOP and the electric oil pump EOP is a trochoid pump without a crescent. However, the embodiments of the present disclosure are not limited to this example. That is, the mechanical oil pump MOP or the electric oil pump EOP may be provided with a crescent when necessary.

(14) In the embodiment described above, the first pump case member CS1 is constituted by two members: the rotor housing case member CS1a and the cover case member CS1b. However, the embodiments of the present disclosure are not limited to this example. That is, the first pump case member CS1 may be constituted by one member in which the rotor housing case member CS1a and the cover case member CS1b are formed as one unit.

(15) In the embodiment described above, the first discharge end opening HO1 and the second discharge end opening HO2 are directly joined to the end opening of the first oil passage 43 and the end opening of the second oil passage 44, respectively, of the valve body VB, so that the first discharge oil passage RO1 and the second discharge oil passage RO2 are respectively connected to the first oil passage 43 and the second oil passage 44 of the valve body VB. However, the embodiments of the present disclosure are not limited to this example. That is, the first discharge end opening HO1 and the second discharge end opening HO2 may be joined to the end opening of the first oil passage 43 and the end opening of the second oil passage 44 of the valve body VB through an oil passage formed in another member, for example.

INDUSTRIAL APPLICABILITY

The present disclosure is preferably applicable to a vehicle hydraulic supply apparatus including a mechanical oil pump configured to be driven by a driving source of a wheel, an electric oil pump configured to be driven by an electric motor, and an oil passage component member for the mechanical oil pump and the electric oil pump.

The invention claimed is:

1. A vehicle hydraulic supply apparatus comprising:
a mechanical oil pump configured to be driven by a driving source of a wheel;
an electric oil pump configured to be driven by an electric motor; and
an oil passage component member for the mechanical oil pump and the electric oil pump, wherein
the oil passage component member includes
a first surface being in contact with a first rotor that is a pump rotor of the mechanical oil pump,
a second surface facing in a direction opposite to a direction in which the first surface faces and being in contact with a second rotor that is a pump rotor of the electric oil pump, and
a suction oil passage and a discharge oil passage of the mechanical oil pump which are located between the first surface and the second surface, and a suction oil passage and a discharge oil passage of the electric oil pump which are located between the first surface and the second surface,
a rotation shaft center of the first rotor is disposed parallel to a rotation shaft center of the second rotor, and
a rotation direction of the first rotor is opposite to a rotation direction of the second rotor.

2. The vehicle hydraulic supply apparatus according to claim 1, wherein
the oil passage component member includes, in an outer peripheral surface of the oil passage component member, a first discharge end opening that is an end opening of the discharge oil passage of the mechanical oil pump and a second discharge end opening that is an end opening of the discharge oil passage of the electric oil pump, and
the first discharge end opening and the second discharge end opening are disposed at different locations as viewed from an axial direction of a rotation shaft center of the first rotor or the second rotor, and at a location overlapping each other as viewed from a circumferential direction of the rotation shaft center.

3. The vehicle hydraulic supply apparatus according to claim 2, wherein
an upstream end portion of the suction oil passage of the mechanical oil pump and an upstream end portion of the suction oil passage of the electric oil pump are configured as a common oil passage.

4. The vehicle hydraulic supply apparatus according to claim 3, wherein
the oil passage component member includes, in an outer peripheral surface of the oil passage component member, a suction end opening shared by the suction oil passage of the mechanical oil pump and the suction oil passage of the electric oil pump, a first discharge end opening that is an end opening of the discharge oil passage of the mechanical oil pump, and a second discharge end opening that is an end opening of the discharge oil passage of the electric oil pump, and
the first discharge end opening and the second discharge end opening are open in a direction opposite to a direction in which the suction end opening is open.

5. The vehicle hydraulic supply apparatus according to claim 3, wherein
an angular range including a suction port of the mechanical oil pump with respect to a rotation shaft center of the first rotor and an angular range including a suction port of the electric oil pump with respect to a rotation shaft center of the second rotor overlap each other.

6. The vehicle hydraulic supply apparatus according to claim 2, wherein
the discharge oil passage of the mechanical oil pump and the discharge oil passage of the electric oil pump do not overlap each other as viewed from an axial direction of the rotation shaft centers of the first rotor and the second rotor, and overlap each other as viewed from a circumferential direction of the rotation shaft centers, in a region radially outward of the first rotor and the second rotor.

7. The vehicle hydraulic supply apparatus according to claim 1, wherein
an upstream end portion of the suction oil passage of the mechanical oil pump and an upstream end portion of the suction oil passage of the electric oil pump are configured as a common oil passage.

8. The vehicle hydraulic supply apparatus according to claim 7, wherein
an angular range including a suction port of the mechanical oil pump with respect to a rotation shaft center of the first rotor and an angular range including a suction port of the electric oil pump with respect to a rotation shaft center of the second rotor overlap each other.

9. The vehicle hydraulic supply apparatus according to claim 1, wherein
the oil passage component member includes, in an outer peripheral surface of the oil passage component member, a suction end opening shared by the suction oil passage of the mechanical oil pump and the suction oil passage of the electric oil pump, a first discharge end opening that is an end opening of the discharge oil passage of the mechanical oil pump, and a second discharge end opening that is an end opening of the discharge oil passage of the electric oil pump, and
the first discharge end opening and the second discharge end opening are open in a direction opposite to a direction in which the suction end opening is open.

10. The vehicle hydraulic supply apparatus according to claim 9, wherein
the discharge oil passage of the mechanical oil pump and the discharge oil passage of the electric oil pump do not overlap each other as viewed from an axial direction of the rotation shaft centers of the first rotor and the second rotor, and overlap each other as viewed from a circumferential direction of the rotation shaft centers, in a region radially outward of the first rotor and the second rotor.

11. The vehicle hydraulic supply apparatus according to claim 1, wherein
an angular range including a suction port of the mechanical oil pump with respect to a rotation shaft center of the first rotor and an angular range including a suction port of the electric oil pump with respect to a rotation shaft center of the second rotor overlap each other.

12. The vehicle hydraulic supply apparatus according to claim 11, wherein
the discharge oil passage of the mechanical oil pump and the discharge oil passage of the electric oil pump do not overlap each other as viewed from an axial direction of the rotation shaft centers of the first rotor and the second rotor, and overlap each other as viewed from a circumferential direction of the rotation shaft centers, in a region radially outward of the first rotor and the second rotor.

13. The vehicle hydraulic supply apparatus according to claim 1, wherein
the discharge oil passage of the mechanical oil pump and the discharge oil passage of the electric oil pump do not overlap each other as viewed from an axial direction of the rotation shaft centers of the first rotor and the second rotor, and overlap each other as viewed from a circumferential direction of the rotation shaft centers, in a region radially outward of the first rotor and the second rotor.

14. The vehicle hydraulic supply apparatus according to claim 1, wherein
the discharge oil passage of the mechanical oil pump from a first discharge port that receives oil discharged from the mechanical oil pump to a first discharge end opening that is an end opening of the discharge oil passage of the mechanical oil pump is located entirely between the first surface and the second surface, and
the discharge oil passage of the electric oil pump from a second discharge port that receives oil discharged from the electric oil pump to a second discharge end opening that is an end opening of the discharge oil passage of the electric oil pump is located entirely between the first surface and the second surface.

* * * * *